United States Patent [19]

Jensen et al.

[11] 4,052,330

[45] Oct. 4, 1977

[54] SINTERING URANIUM OXIDE USING A PREHEATING STEP

[75] Inventors: Neil John Jensen, Mountain View; Yogesh Nivas, San Jose; Douglas Randall Packard, Sunol, all of Calif.

[73] Assignee: General Electric Company, San Jose, Calif.

[21] Appl. No.: 560,534

[22] Filed: Mar. 20, 1975

[51] Int. Cl.² .............................................. G21C 3/58
[52] U.S. Cl. ................................ 252/301.1 R; 264/.5
[58] Field of Search ............................ 264/.5; 176/89; 252/301.1 R

[56] References Cited

U.S. PATENT DOCUMENTS

| 3,786,120 | 1/1974 | Hollander et al. | 264/.5 |
| 3,808,145 | 4/1974 | Packard et al. | 264/.5 |
| 3,872,022 | 3/1975 | Hollander et al. | 264/.5 |

*Primary Examiner*—Leland A. Sebastian
*Attorney, Agent, or Firm*—Ivor J. James, Jr.; Sam E. Laub; Samuel E. Turner

[57] ABSTRACT

Compacted pellets of uranium oxide or uranium oxide with one or more additives are heated in a kiln in a process having a preheating step, a sintering step, a reduction step, and a cooling step in a controlled atmosphere. The process is practiced to give a range of temperature and atmosphere conditions for obtaining optimum fluoride removal from the compacted pellets along with optimum sintering in a single process. The preheating step of this process is conducted in a temperature range of about 600° to about 900° C and the pellets are held for at least twenty minutes, and preferably about 60 minutes, in an atmosphere having a composition in the range of about 10 to about 75 percent hydrogen by volume with the balance being carbon dioxide. The sintering step is conducted at a temperature in the range of about 900° C to 1500° C in the presence of an atmosphere having a composition in the range of about 0.5 to about 90 percent hydrogen by volume with the balance being carbon dioxide. The reduction step reduces the oxygen to metal ratio of the pellets to a range of about 1.98 to 2.10:1 and this is accomplished by gradually cooling the pellets for about 30 to about 120 minutes from the temperature of the sintering step to about 1100° C in an atmosphere of about 10 percent to about 90 percent hydrogen by volume with the balance being carbon dioxide. Thereafter the pellets are cooled to about 100° C under a protective atmosphere and in one preferred practice the same atmosphere used in the reduction step is used in the cooling step. The preheating, sintering and reduction steps may also be conducted with their respective atmospheres having an initial additional component of water vapor and the water vapor can comprise up to about 20 percent by volume.

21 Claims, 2 Drawing Figures

SINTERING URANIUM OXIDE USING A PREHEATING STEP

BACKGROUND OF THE INVENTION

This invention relates to the production of sintered uranium oxide containing compositions. One of the very important utilities of uranium oxide, especially uranium dioxide, is in nuclear power plants as a fuel in the generation of electric power. The uranium dioxide, either alone or in a mixture with other ceramics such as gadolinium oxide or plutonium oxide, is compacted to a given size and shape and sintered to achieve dense bodies for use in a nuclear fuel rod. The uranium present in uranium dioxide must be enriched with the U-235 isotope for use in light water reactors. Presently this is done in a gaseous state, the preferred practice being to use uranium hexafluoride. After enrichment it is necessary to convert the uranium hexafluoride to uranium dioxide. The resulting uranium dioxide can contain undesired fluoride ion concentrations and an oxygen to metal ratio above the desired ratio of about 1.98:1 to about 2.10:1.

The sintering of uranium dioxide structures has been used as the step in the process to attempt to reduce the oxygen and the fluoride content of the uranium dioxide. The current practice has been the use of wet hydrogen atmospheres at temperatures preferably greater than 1600° C to achieve dense bodies of uranium dioxide. Past experience indicates a certain amount of water vapor mixed with the hydrogen is required to remove the fluoride from compacted ceramic structures during sintering, but the wet hydrogen process has not been satisfactory when the ceramic has high fluoride concentrations.

Another method presented in U.S. Pat. No. 3,375,306 for sintering dense uranium dioxide structures with or without ceramic additives is to heat the compressed powder at a temperature of 1300° to 1600° C in a sintering atmosphere of carbon dioxide or a mixture of carbon dioxide and carbon monoxide and cooling the sintered structure in a reducing atmosphere which varies as the composition of the structure varies. Where the structure being sintered is uranium dioxide the cooling gas is dry hydrogen, wet hydrogen or a mixture of carbon dioxide and carbon monoxide. Where the structure is uranium dioxide with an additive of plutonium dioxide, the cooling gas is steam or carbon dioxide mixed with carbon monoxide. The use of a mixture of carbon dioxide and carbon monoxide is more costly than use of wet hydrogen but enables the use of lower temperatures to achieve sintered structures of high density. However this carbon monoxide-carbon dioxide sintering atmosphere does not appreciably decrease the fluoride content of the uranium dioxide structures.

In U.S. Pat. No. 3,872,022, issued Mar. 18, 1975, in the names of W. R. DeHollander and Yogesh Nivas, there is disclosed a process for sintering compacted pellets of uranium oxide in the presence of a gas which initially consists essentially of a mixture of hydrogen and carbon dioxide, either alone or with an inert carrier gas, and holding the pellets at the desired temperature in this resultant atmosphere to sinter pellets. In the specification, there is disclosed a batch process where the pellets of uranium oxide are placed in a suitable container in a cold furnace, heated to the sintering temperature under the hydrogen-carbon dioxide atmosphere and maintained at this temperature for a period of from about 1 to about 5 hours followed by cooling the pellets in an atmosphere having an oxygen partial pressure in the range of about $10^{-4}$ to $10^{-18}$ atmospheres of oxygen with a preferred value being in the range of $10^{-12}$ to $10^{-18}$ atmospheres of oxygen. In another embodiment there is disclosed a process using a furnace having three zones of temperature consisting of a preheating zone, a sintering zone and a cooling zone. The first region through which the boat passes is a preheating zone which has an increasing temperature as the boat moves closer to the sintering zone. In the preheating zone the atmosphere of the kiln is a mixture of hydrogen and carbon dioxide. Fluoride impurities are expelled from the pellets in this zone before the ceramic boat reaches the sintering zone. When the boat reaches the sintering zone, the temperature is maintained in the range of 900° to 1500° C during which a substantial proportion of the sintering practiced in this invention occurs. The atmosphere in the sintering zone according to this practice is the same as that in the preheat zone and is in the range of about 0.5 to about 90 percent by volume hydrogen with the balance being carbon dioxide. When a boat reaches the cooling zone the temperature falls as the distance from chemical reduction is increased. U.S. Pat. No. 3,872,022 is assigned to the same assignee as the present application.

A process using an atmosphere of a mixture of hydrogen and carbon dioxide for defluorinating and controlling the oxygen to metal ratio of a particulate composition is disclosed in U.S. patent application Ser. No. 358,738, filed May 9, 1973 in the name of Yogesh Nivas, entitled "Ceramic Defluorination and Reduction Process." This application is assigned to the same assignee as the present application.

Another process using an atmosphere of a mixture of hydrogen and carbon dioxide along with an additive of water vapor as introduced to the furnace is disclosed in U.S. Pat. No. 3,808,145. This process is for defluorinating and controlling the oxygen-to-metal ratio of a particulate composition containing uranium compounds.

Sintering at temperatures of about 1600° C or higher to produce uranium dioxide structures is a relatively expensive process due to high rates of energy consumption. Lower sintering temperatures under controlled atmospheres have the advantage of yielding a controlled oxygen to metal ratio of the sintered structure and more effectively removing undesirable impurities from the sintered structure such as undesirable impurities of fluoride ions.

Lower sintering temperatures, in addition to saving energy, represent a considerable cost savings in cheaper building materials for kiln construction, a longer functional life for the sintering kiln and its associated fixtures and less corrosion of the kiln components.

The use of an atmosphere of a mixture of hydrogen and carbon dioxide does enable the use of a lower temperature for sintering of structures of compacted powders rich in uranium dioxide.

Another problem encountered with uranium oxide enriched with the U-235 isotope is the presence of fluoride impurities. There is evidence to indicate that residual fluoride in uranium oxide fuel pellets may have a serious corrosive effect upon the cladding, materially reducing the life of the fuel rod in the reactor. For this reason, the quality specification on pellets is in the range of parts per million (ppm), with serious consideration being given to reducing the permissable level of fluoride to the parts per billion range, or less than 1 ppm.

The bulk of the fluoride is removed from the product during the calcination of $UO_2$ in a calciner, but total removal at this point would spoil the powder for further processing due to the higher temperatures that would be required for such removal. Typically, the calcined powder has fluoride between 50 and 200 ppm.

The last opportunity for removing fluoride from fuel pellets during manufacture is in the sintering step. Ordinarily the removal is achieved randomly in conventional high temperature sintering. In controlled atmosphere (oxidative) sintering, the fluoride level can be regulated by variations in the temperature, atmosphere and dwell time within the preheat section of the sintering furnace. However, once the pellets begin sintering it is very difficult to remove the fluoride any further.

Objects of the Invention

Accordingly it is an object of this invention to provide an improved process for the sintering of structures of compacted powders rich in uranium oxide which contain unacceptably high fluoride impurities prior to sintering so that this invention achieves very low fluoride content in the final sintered structures.

A further object of this invention is to provide a controlled preheating step in the process for sintering structures of compacted powders rich in uranium oxide, the step involving a prolonged preheating at a temperature in the range of about 600° to about 900° C under a controlled atmosphere of about 10 percent to about 75 percent hydrogen by volume with the balance being carbon dioxide.

A preferred object of this invention is to provide a controlled preheating step in the process for sintering structures of compacted powders rich in uranium oxide at a temperature in the range of about 700° to about 800° C.

Still another preferred object of this invention is to provide a controlled preheating step in the process for sintering structures of compacted powders rich in uranium oxide in an atmosphere having a composition of about 30 percent hydrogen by volume with the balance being carbon dioxide.

A still further preferred object of this invention is to provide a controlled preheating step in the process for sintering structures of compacted powders rich in uranium oxide for a prolonged period of preheating of at least about 20 minutes and preferably about 60 minutes.

An additional object of this invention is to provide a process in which the preheating, sintering and reduction step may also be conducted with their respective atmospheres having an initial additional component of water vapor up to about 20 percent by volume.

Other objects and advantages of this invention will become apparent from the following specification and the appended claims.

SUMMARY OF THE INVENTION

The above objects, and others, are accomplished according to this invention by providing a striking improvement in a process for sintering of ceramic structures of compacted powder rich in uranium oxide involving a preheating step in which the structures are heated at a temperature in the range of about 600° to about 900° C in a controlled atmosphere of a mixture of hydrogen and carbon dioxide with or without added water vapor, for a prolonged period of time of at least about 20 minutes and preferably about 60 minutes. The composition of the preheating atmosphere is maintained in the range of about 10 to about 75 percent hydrogen with the balance being carbon dioxide, and the atmospere can have additions of inert gases such as argon and nitrogen. The carbon dioxide and hydrogen react to give carbon monoxide and water vapor which when maintained in the foregoing temperature range, enables the removal of undesirable fluoride impurities from the ceramic structures. When water vapor is added to the atmosphere for introduction to the preheating step, the water vapor can comprise up to about 20 percent by volume. After the preheating step, a sintering step is practiced at a temperature in the range of about 900° to about 1500° C under an atmosphere of hydrogen and carbon dioxide, with or without an additional component of water vapor comprising up to about 20 percent of the volume of the atmosphere. Then a chemical reduction step is practiced on the composition, and at this point the oxygen to metal ratio of the uranium oxide is reduced to a range of 1.98 to 2.10:1 and preferably to less than 2.025:1 and more preferably to less than 2.005:1. The pellets are next subjected to a cooling step under a controlled atmosphere where they are cooled to a low temperature and removed from the kiln. The cooling step is under an atmosphere having an oxygen partial pressure in the range of $10^{-4}$ to $10^{-45}$ atmospheres of oxygen. This process yields sintered compacted pellets of uranium oxide having a very low fluoride content due to the prolonged treatment in the preheating step.

This process has yielded ceramic pellets of uranium oxide with very favorable properties for use as nuclear fuel.

BRIEF DESCRIPTION OF THE DRAWING

The practice of the disclosed process will be further understood by reference to the accompanying drawing in which.

DETAILED DESCRIPTION OF THE INVENTION

Figure 1:
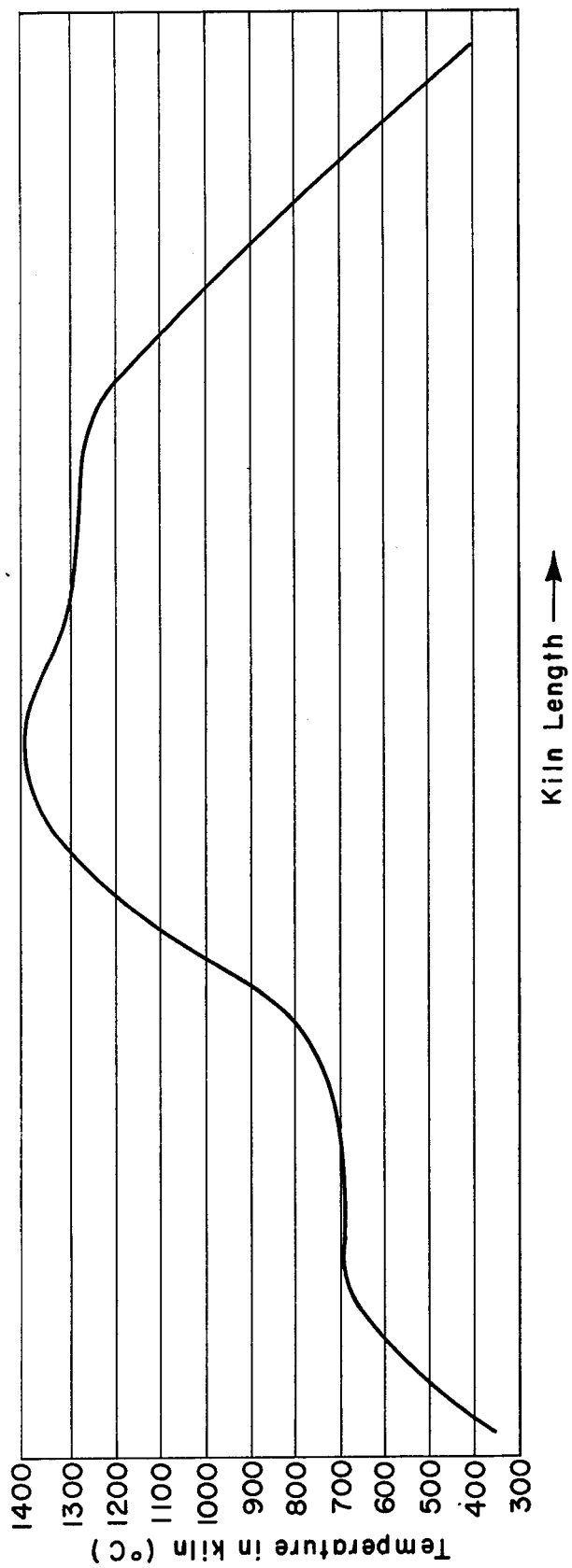
FIG. 1 is a kiln adapted to receive a sintering atmosphere as disclosed in this invention for ceramic shapes being sintered, along with a graph of the temperature profile of the kiln.
Figure 1:
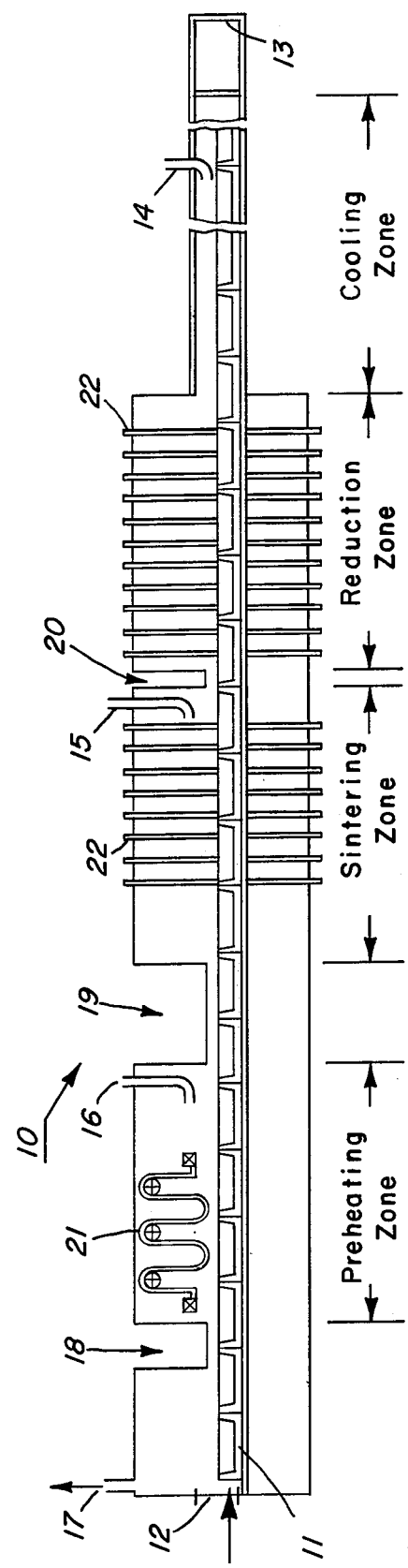

It has been discovered that compacted powders of a ceramic comprising uranium oxide containing compositions, with or without ceramic additives, may be sintered to very high density with a very low impurity content by first preheating the structure to a temperature in the range of about 600° to about 900° C in a controlled atmosphere of hydrogen and carbon dioxide for a prolonged period of time of at least about 20 minutes and preferably about 60 minutes in an atmosphere comprising about 10 percent to about 75 percent hydrogen with the balance being carbon dioxide. The preheating step of this process produces a ceramic composition having a fluoride ion content of about 5 parts per million or less. The preheating step, in addition to removing fluoride, removes other undesired impurities and contamination from the uranium oxide containing compositions such as entrapped hydrocarbons, entrapped gases, greases, oils, etc. Without this preheating step, that is passing rapidly through the 600° to 900° C range, fluoride impurities are not removed, and these impurities become locked into the composition during sintering. This impurity removal is a time dependent function, requiring time for the fluoride to diffuse to the surface of a deep bed of pellets and be taken up by the kiln atmosphere. The amount of time required depends upon the depth of the bed and the rate (kg/hr) at which uranium oxide pellets are sintered. The preheating atmosphere can include an inert gas such as argon or nitrogen and an additional component of water vapor and the water vapor can comprise up to about 20 percent by volume of the preheating atmosphere.

After the preheating step there is conducted a sintering step involving heating to a temperature in the range of about 900° to about 1500° C in an atmosphere consisting of a mixture of hydrogen and carbon dioxide, with or without added water vapor. The sintering step of this process produces a ceramic composition having a density of up to about 99 percent of theoretical density and preferably a density in the range of 92 to 96 percent of theoretical density.

After completion of the sintering step, the sintered ceramic pellets are subjected to a reduction step where they are gradually cooled for about 30 minutes to about 120 minutes, from the temperature of the sintering step to about 1100° C, in an atmosphere of about 10 percent to about 90 percent hydrogen by volume with the balance being carbon dioxide. In a preferred practice the temperature of this step is maintained in the range of about 1350° to 1200° C. The reduction atmosphere can also include an inert atmosphere such as nitrogen, argon or a combination thereof and an additional component of water vapor with the water vapor comprising up to about 20 percent by volume of the reduction atmosphere. A preferred atmosphere and temperature is about 35 to about 60 percent hydrogen with the balance being carbon dioxide.

Thereafter the ceramic pellets are cooled to room temperature in an atmosphere that prevents their oxidation. One such atmosphere has an oxygen partial pressure in the range of $10^{-4}$ to $10^{-45}$ atmospheres of oxygen, such as an atmosphere of dry hydrogen, wet hydrogen, dry carbon monoxide, wet carbon monoxide, inert gases such as nitrogen, argon, helium, and neon and mixtures of the foregoing including a mixture of hydrogen and carbon dioxide preferably within the ranges disclosed in this invention for the reduction step.

The phrase "uranium oxide containing compositions" is used herein to cover compositions capable of being sintered in the practice of this invention which include uranium dioxide ($UO_2$) and mixtures of uranium oxide having an oxygen to metal ratio of up to 2.25 which could include mixtures of uranium dioxide with one or more of the following: uranium trioxide ($UO_3$), uranium tritaoctoxide ($U_3O_8$), uranium sesquioxide ($U_2O_3$), uranium pentoxide ($U_2O_5$), or uranium tetroxide ($UO_4$), or any other oxy-uranium compounds, as $U_4O_9$, for example. The invention is also applicable for the foregoing uranium oxide containing compositions with one or more ceramic additives including the plutonium oxides such as plutonium dioxide ($PUO_2$), gadolinium oxide ($Gd_2O_3$), titanium dioxide ($TiO_2$), silicon dioxide ($SiO_2$), aluminum oxide ($Al_2O_3$), clays, or combinations thereof. Further the compositions can include organic additives often used as binders, lubricants, or pore formers for density regulation, such as waxes, oils, or other volatiles included in the state of the art.

The atmosphere used in the preheating step in the range of about 10 percent to about 75 percent hydrogen by volume with the balance being carbon dioxide, and a particularly preferred composition is about 30 ± 5 percent hydrogen by volume with the balance being carbon dioxide. Any source of hydrogen can be employed such as cylinders and tanks of hydrogen or a gas such as ammonia which dissociates to provide a source of hydrogen. The atmosphere in the preheating zone may also contain inert gases or carrier gases such as nitrogen and argon in addition to the essential constituents of hydrogen and carbon dioxide. This step may also be conducted so that the foregoing atmosphere has an initial additional component of water vapor up to about 20 percent by volume.

The atmosphere in the sintering step is in the range of about 0.5 to about 90 percent hydrogen by volume with the balance being carbon dioxide, and a preferred range is about 2 to about 20 percent hydrogen by volume with the balance being carbon dioxide. Any source of hydrogen can be employed such as cylinders and tanks of hydrogen or a gas such as ammonia which dissociates to provide a source of hydrogen. The sintering atmosphere can contain inert gases such as nitrogen and argon in addition to the essential constituents of hydrogen and carbon dioxide. This step may also be conducted so that the foregoing atmosphere has an initial additional component of water vapor up to about 20 percent by volume.

The atmosphere used in the chemical reduction step is in the range of about 10 percent to 90 percent hydrogen by volume with the balance carbon dioxide, with a preferred range of about 35 percent to 60 percent hydrogen with the balance being carbon dioxide. As in other zones, any source of hydrogen can be employed as previously described. The atmosphere used in this step can contain inert gases such as nitrogen and argon. This step may also be conducted so that the foregoing atmosphere has an initial additional component of water vapor up to about 20 percent by volume.

The mixture of carbon dioxide and hydrogen constituting the atmospheres in the three zones reacts in thermodynamic equilibrium at elevated temperatures as follows:

$$CO_2 + H_2 \rightarrow CO + H_2O, \qquad 1$$

$$H_2O \rightarrow H_2 + \tfrac{1}{2} O_2. \qquad 2$$

The degree of reaction, that is, the resultant composition of these gases, is determined by the equilibrium constant of the above reactions and the equilibrium constant is a function of the temperature of the gases. The atomic ratio of oxygen to metal of the ceramic being sintered varies as the partial pressure of oxygen in the atmosphere varies. The oxygen content varies with the temperature and the composition of the initial starting gases. The desired oxygen to metal ratio of the uranium oxide compositions is obtained by adjusting the partial pressure of oxygen in the chemical reduction zone atmosphere. This is done by varying the temperature and the feed rates of hydrogen and carbon dioxide. The partial pressure of oxygen in the atmosphere of the preheating zone can be reduced by increasing the hydrogen constituent there. An increase in the partial pressure of oxygen in the atmosphere in the sintering zone is achieved by increasing the carbon dioxide constituent in that zone.

In one preferred practice, the gases are introduced in the cooling zone of the kiln with flow countercurrent to the movement of the composition being treated. This gas flows from the cooling zone into the reduction zone and then the sintering zone, where additional carbon dioxide is added to produce the optimum composition for the sintering zone. all gases then flow into the preheating zone where additional hydrogen is added to yield the optimum composition of gases there. The temperatures in the reduction zone and sintering zone are sufficient to cause almost instantaneous equilibrium of the reaction between the components of the atmosphere.

In the practice of this invention, an enhanced sintering rate results during the sintering of the uranium oxide containing compositions due to the higher diffusion rate of the slower moving species of metallic ions in the sintered composition. By choosing a gas composition having a mixture of carbon dioxide and hydrogen determined by the partial pressure of oxygen desired for each zone of the kiln, the uranium oxide containing composition can be treated to remove fluoride impurities, sintered at the desired oxygen to metal ratio giving enhanced sintering at lower temperatures than practiced in the prior art.

Figure 2:
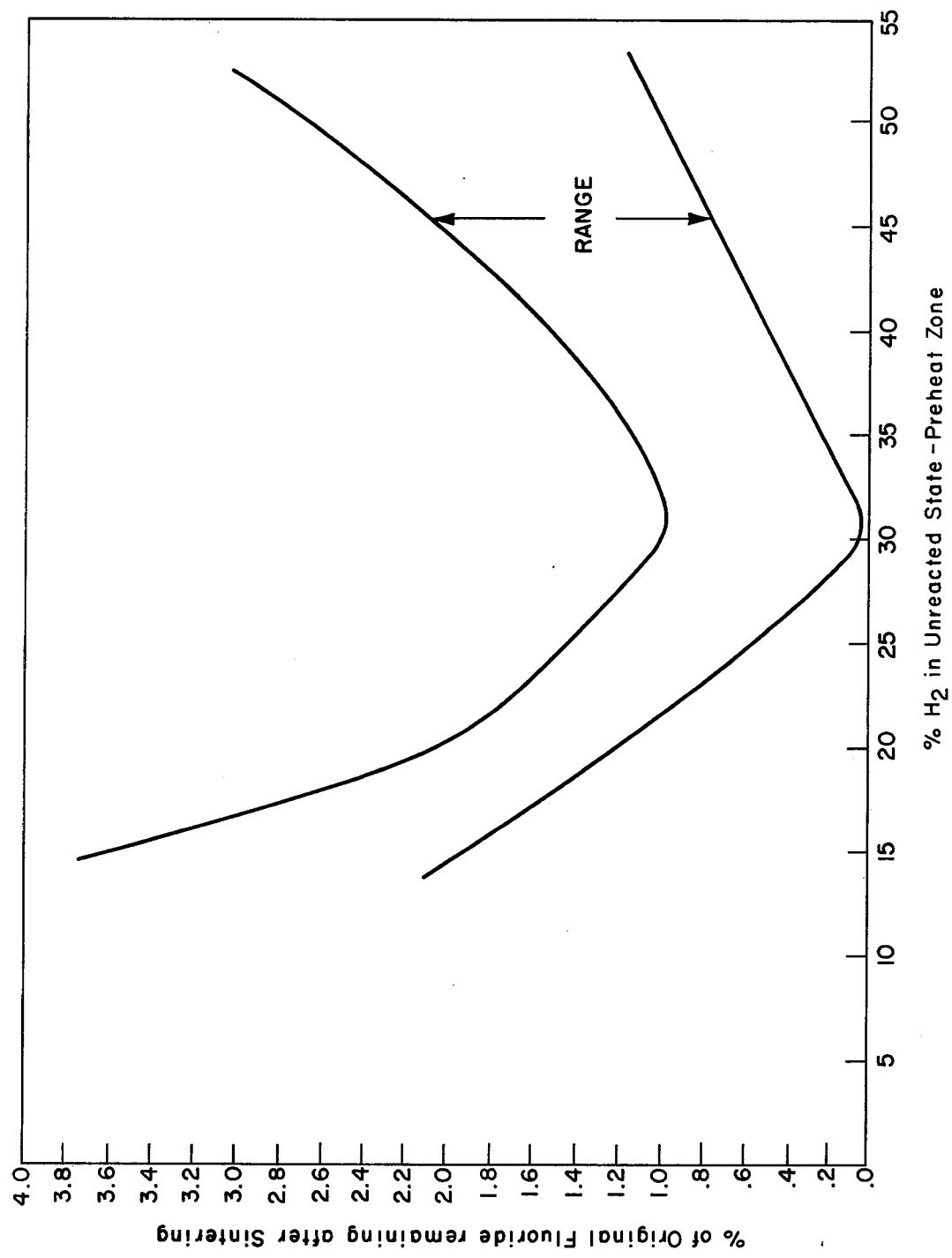
FIG. 2 is a graph of the percent of original fluoride after sintering versus the percent hydrogen in an unreacted state in the preheating zone.

The water vapor in the atmosphere acts as a hydrolysis agent in the preheating zone for removing fluoride ions and when the hydrogen component is within the range set forth above the final fluoride content of the uranium oxide composition will be reduced to 1/50 to 1/100 of the initial content prior to introduction into the kiln, typically 1 to 2 parts per million. As stated previously, a certain amount of water vapor is needed to promote the removal of fluoride from compacted uranium oxide structures during sintering. The amount of water vapor in the carbon dioxide-hydrogen atmosphere decreases as the gas composition is selected from an increasingly carbon dioxide rich or an increasingly hydrogen rich mixture. FIG. 2 is a graph of the residual fluoride in sintered uranium dioxide pellets versus the percent of hydrogen in an unreacted state in the atmosphere of the preheating zone.

The following is representative of the preliminary processing of the uranium oxide powder into pellet form before it is introduced into the kiln, but this is in no way meant to be a limitation of the teaching of this invention. The uranium oxide employed in the process of this invention can be commercial grades of the ceramic having up to 0.5 percent by weight fluoride ions or greater and varying oxygen to metal ratios. The uranium oxide in powder form is pressed, preferably isostatically, at pressures from about 1,000 to about 10,000 pounds per square inch. Other pressing methods could also be used if an isostatic press is unavailable. The pressed shapes are then granulated and screened through a screen having openings in the range of about 5 to about 20 mesh. This processing sequence increases the flow properties and bulk density of the uranium oxide powder. Organic additives may be added at this point, if desired, by any number of standard ceramic techniques to improve pressing characteristics or microstructure of the sintered pellets. The powder is pressed into cylindrical pellets of about ½ inch in length and diameter at applied pressure of 30,000 to 40,000 pounds per square inch. Five to six kilograms of pellets are then stacked in a ceramic boat capable of withstanding the temperature and atmosphere used in the kiln. Porous aluminum oxide boats are very suitable for this. Boats full of pellets are then pushed, one behind the other, through a tunnel kiln as illustrated in FIG. 1 with a temperature profile as illustrated at the top of FIG. 1, at a rate of 12 to 24 inches of travel speed per hour under the atmospheres as specified above for this process. To insure proper protection of the atmosphere in the kiln, double door purge chambers should be used at the entrance and exit of the kiln. In one embodiment of the process typical gas flows have been:

|  | $H_2$ | $H_2$ Cumulative | $CO_2$ | $CO_2$ Cumulative |
| --- | --- | --- | --- | --- |
| Reduction Zone | 24cfh* | 24cfh | 16cfh | 16cfh |
| Sintering Zone | — | 24cfh | 224cfh | 240cfh |
| Preheating Zone | 36cfh | 60cfh | — | 240cfh |

*cfh = cubic feet per hour

The invention can be practiced as a batch type process where the pellets of uranium oxide are placed in a suitable container in a cold kiln, heated to the range of the preheating temperature under the hydrogen-carbon dioxide atmosphere as specified above for the preheating stop, and then heated to the range of the sintering temperature under the hydrogen-carbon dioxide atmosphere as specified above for the sintering step and, then cooled slightly for reduction before cooling for removal from the kiln. The temperature profile of FIG. 1 would be applicable to this process.

The invention can be practiced as a continuous type process where pellets of uranium oxide are placed in suitable containers (i.e. porous aluminum boats) and put into a heated kiln as shown in FIG. 1. In greater detail the kiln generally designated by the number 10 is a tunnel kiln with overall length in one embodiment of about 40 feet. A continuous line of sintering boats 11 are pushed in a line from the entrance 12 to the exit 13. The gases used in the controlled atmosphere are introduced at inlet 14 for the cooling and reduction zones, at inlet 15 for the sintering zone and at inlet 16 for the preheat zone. The gases are introduced to flow countercurrently to the travel direction of the uranium oxide pellets, and emerge as exhaust gases from exhaust 17. The zones of the kiln are generally marked by dropped arches as shown at 18, 19 and 20. The preheating zone of the kiln is heated by a pair of nichrome ribbon heating elements 21 hanging on either side of the line of boats and the elements 21 are located toward the front half of the preheating zone. The sintering zone and the reduction zone are heated by vertical silicon carbide rod heating elements 22. The entire kiln is encased in an airtight steel chamber (not shown for clarity of illustration) with appropriate controls and safety devices for automatic operation (also not shown for clarity of illustration).

Above the FIGURE of the kiln there is a plot of temperature (in °C) inside the kiln along the length of the kiln.

Heat is supplied to the tunnel kiln by commercially available heating elements. Nichrome ribbon hanging on either wall of the front half of the preheat zone supplied heat to that zone. The sintering zone and chemical reduction zones were heated by a series of vertical silicon carbide heating elements. The wall can be made of standard insulating brick, faced with alumina for strength. Because of the oxidizing nature of the atmosphere, metals are not recommended in the higher temperature regions.

This invention has the advantage of producing pellets with very low fluoride content due to the preheating step at temperatures below the sintering range. The foregoing temperature range and compositional range for the atmosphere in the preheating step have achieved the optimum in removal of fluoride ions from uranium oxide compositions.

This invention also involves the sintering of uranium oxide structures at low temperatures of about 900° to about 1500° C thus avoiding the necessity for heating at temperatures in excess of 1600° C when utilizing a wet hydrogen atmosphere for sintering uranium oxides. The present invention also has the advantage of controlling the partial pressure of oxygen in the kiln by controlling the relative proportions of carbon dioxide and hydrogen (and the water vapor when initially added) in the atmosphere.

Another feature of this invention is the range of processing parameters enabling a person skilled in the art great flexibility in selecting the precise operating parameters depending on the properties desired for the sintered uranium oxide containing composition.

The preheating step with its substantial removal of fluoride impurities and the low temperatures in the sintering step enables lower operating costs for heating the kiln because of reduced energy consumption. This also allows cheaper and more efficient refractory materials to be used, while at the same time providing a longer kiln life due to less corrosive conditions inside the kiln at the lower temperatures.

The teaching of this invention and the methods by which it is to be performed will become apparent from the following examples which are offered to be illustrative of the invention but are not to serve as a limitation of the teaching of this invention.

EXAMPLE 1

Cylindrical pellets measuring about 1.5 centimeters in length and diameter were pressed from uranium oxide powder and stacked in alumina boats five layers deep, to give a total boat charge of five to six kilograms. These were sintered by stoking them through a forty foot continuous tunnel kiln as shown schematically in FIG. 1, the interior of which was divided into zones as shown in FIG. 1. These zones facilitated accurate control over the atmosphere and temperature throughout the entire sintering process, commensurate with this invention.

Temperature measurement and control was by means of thermocouples (appropriately selected to be compatible with the temperature). Additional thermocouples were installed along the length of the preheating zone to monitor the flatness of the temperature plateau in that region.

The preheating zone of the kiln was heated by two nichrome ribbons 21 hanging on opposite walls. Only the front portion of the zone was heated by these ribbons, leaving the rear portion to derive its heat from the neighboring sintering zone. This aided in flattening the temperature plateau in the preheating zone as disclosed in this invention. The sintering and reduction zones of the kiln were heated by means of silicon carbide heating elements 22.

The atmosphere gases of the kiln, comprising a mixture of hydrogen and carbon dioxide, are passed countercurrently to the travel direction of the boats containing the pellets.

The composition of the gases was controlled by injecting gas at specified points to add to the cumulative flow. For example, additional carbon dioxide was added in the sintering zone to the gas coming from the reduction zone to give the desired gas composition at that point. Additional hydrogen was added in the preheating zone to yield the desired gas composition there. In the specific examples listed below, the percentage of hydrogen given represents the cumulative totals of all gases flowing through the preheating zone including both the gas introduced through inlet 16 and the atmosphere gas flowing from the sintering zone.

A boat of pellets was sintered, setting the preheating zone temperature plateau at 700° C with flowing gas over the surface consisting of 10 percent $H_2$, balance $CO_2$. The pellets moved through this temperature for a period of one hour before moving on to be sintered. The green (unsintered) uranium oxide powder introduced to the kiln contained an average of 408 parts per million fluoride. Sintered pellets of all samples taken averaged 13 parts per million fluoride.

EXAMPLE 2

The procedure of Example 1 was repeated, and another boat of identical pellets was sintered under identical conditions with the single exception that the hydrogen content was raised to 15 percent in the preheating zone. This yielded pellets averaging 10 parts per million fluoride.

EXAMPLE 3

Four individual tests were made wherein conditions were identical to those of Example 1 except as noted in the table below. The temperature plateau in the preheat zone was 800° C. Pellets were exposed to this temperature for a period of one hour during their movement through the kiln. The green uranium oxide powder introduced to the kiln had an average of 408 parts per million fluoride. Sintered results are listed:

| Percent Hydrogen (Balance $CO_2$) in the atmosphere | Average Residual Fluoride in Sintered pellets |
|---|---|
| 15% | 15 ppm |
| 20% | 6.6 ppm |
| 30% | 1.9 ppm |
| 50% | 7.2 ppm |

These results are illustrated in FIG. 2 indicating approximately where maximum and minimum valves were obtained in a plot of percent of original fluoride remaining after sintering versus percent hydrogen in an unreacted state in the preheating zone.

EXAMPLE 4

The procedure of Example 1 was repeated, and a boat of pellets was sintered, setting the preheating zone temperature plateau at 800° C under an atmosphere of 19 percent $H_2$ with the balance being $CO_2$. The pellets moved through the preheating zone for a period of 2 hours and then into the sintering zone. The green (unsintered) uranium oxide pellets had an average fluoride content of 102 parts per million. Sintered pellets were found to have an average fluoride content of 1.0 parts per million.

EXAMPLE 5

Again the procedure of Example 1 was repeated, and six boats of pellets were sintered, setting the preheating zone temperature plateau at 800° C with atmosphere consisting of 19 percent, $H_2$, balance $CO_2$. The pellets moved through this temperature for a period of 48 minutes before moving on to high temperatures for sintering. The green (unsintered) uranium oxide pellets contained an average of 102 parts per million fluoride. The average residual fluoride in the sintered pellets from first through sixth boat were: 1.6 parts per million, 0.6 parts per million, 1.3 parts per million, 0.7 parts per million, 0.8 parts per million and 1.7 parts per million. The overall average of fluoride impurities for the six boats was 1.3 parts per million.

It is to be understood that, although the invention has been described with specific references to particular embodiments thereof, it is not to be so limited, since changes and alterations therein may be made which are within the full intended scope of this invention as defined by the appended claims.

What is claimed is:

1. A method for producing dense sintered bodies of a particulate composition comprising uranium oxide substantially free of fluoride ions comprising the steps of (1) preheating compacted bodies of the composition comprising uranium oxide, which composition can contain fluoride impurities, for a period of at least about 20 minutes to a temperature in the range of about 600° to about 900° C in an atmosphere consisting essentially of an initial mixture of carbon dioxide and hydrogen, either alone or with an inert gas, which mixture reacts to give the presence of water vapor and carbon monoxide, said atmosphere having about 30 ±2 percent hydrogen by volume with the balance being carbon dioxide, (2) heating the compacted bodies to a temperature in the range of about 900° to about 1500° C in an atmosphere consisting essentially of a mixture of carbon dioxide and hydrogen, either alone or with an inert gas, which mixture reacts to give the presence of water vapor and carbon monoxide thus effecting sintering of the bodies in said atmosphere, said atmosphere having from about 0.5 to about 90 percent hydrogen by volume with the balance being carbon dioxide, (3) thereafter holding the sintered bodies in a reducing atmosphere consisting essentially of a mixture of hydrogen and carbon dioxide to alter the ratio of oxygen to uranium atoms in the sintered uranium oxide to within the range of 1.98:1 to about 2.10:1, said atmosphere having from about 10 to about 90 percent hydrogen by volume with the balance being carbon dioxide, and (4) cooling the bodies in a protective atmosphere having an oxygen partial pressure in the range of about $10^{-4}$ to about $10^{-45}$ atmospheres of oxygen, said atmosphere being selected from the group consisting of dry hydrogen, wet hydrogen, dry carbon monoxide, wet carbon monoxide, inert gases, a mixture of hydrogen and carbon dioxide, and a mixture of any of the foregoing.

2. A method according to claim 1 in which the atmosphere used in the preheating step has about 30 percent hydrogen by volume and the balance is carbon dioxide.

3. A method according to claim 1 in which the preheating step is conducted for a period of about 20 to about 90 minutes.

4. A method according to claim 1 in which the sintering atmosphere has from about 2 to about 20 percent hydrogen by volume and the balance is carbon dioxide.

5. A method according to claim 1 in which the uranium oxide is uranium dioxide.

6. A method according to claim 1 in which the preheating atmosphere has an initial additional component of water vapor.

7. A method according to claim 6 in which the water vapor comprises up to about 20 percent by volume of the sintering atmosphere.

8. A method according to claim 1 in which the sintering atmosphere has an initial additional component of water vapor.

9. A method according to claim 8 in which the water vapor comprises up to about 20 percent by volume of the sintering atmosphere.

10. A method according to claim 1 in which the chemical reduction step has an atmosphere having an initial additional component of water vapor.

11. A method according to claim 1 in which the compacted bodies contain an additive.

12. A method according to claim 1 in which the hydrogen in the atmosphere used in the preheating step is from dissociated ammonia and the preheating atmosphere has a carrier gas of nitrogen.

13. A method according to claim 1 in which the hydrogen in the atmosphere used in the sintering step is from dissociated ammonia and the sintering atmosphere has a carrier gas of nitrogen.

14. A method according to claim 1 in which the atmosphere used in the preheating step includes an inert gas.

15. A method according to claim 14 in which the inert gas is nitrogen.

16. A method according to claim 1 in which the atmosphere used in the sintering step includes an inert gas.

17. A method according to claim 16 in which the inert gas is argon.

18. A method according to claim 16 in which the inert gas is nitrogen.

19. A method according to claim 1 in which the protective atmosphere in the cooling step is comprised of a mixture of hydrogen and carbon dioxide.

20. A method according to claim 1 in which the uranium oxide is comprised of a mixture of uranium oxide having an oxygen to metal ratio from above about 2.00 to about 2.25.

21. A method according to claim 14 in which the inert gas is argon.

* * * * *